INVENTORS
ARTHUR P. NOTTHOFF, JR.
JAMES E. COX
BY John F. Lawler
ATTORNEY

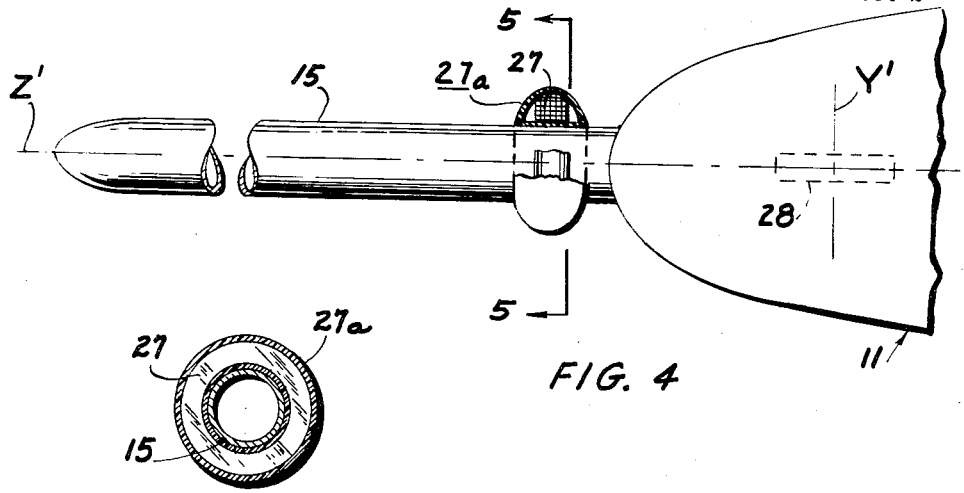
FIG. 4
FIG. 5
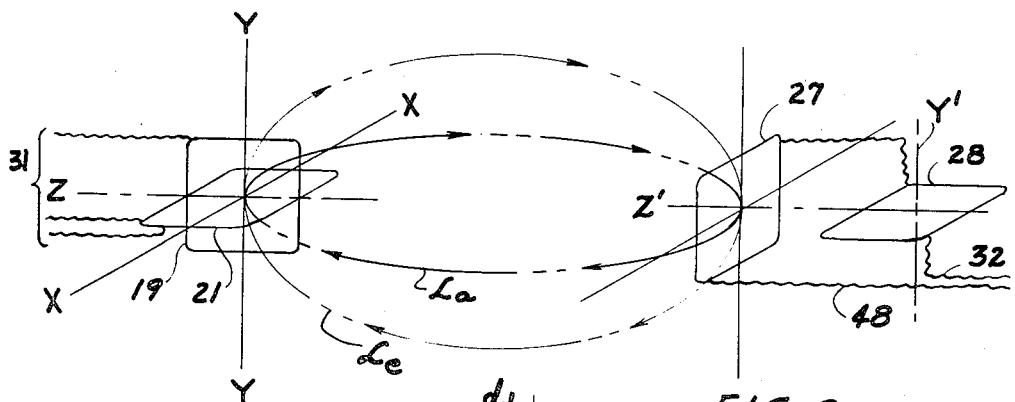
FIG. 6
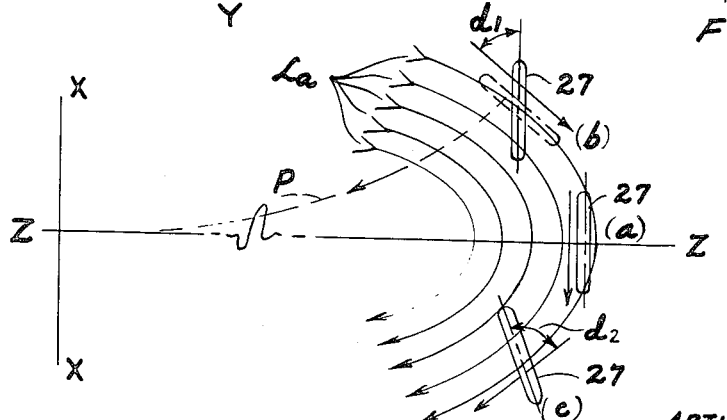
FIG. 7
INVENTORS
ARTHUR P. NOTTHOFF, JR.
JAMES E. COX
BY John F. Lawler
ATTORNEY June 21, 1960  J. E. COX ET AL  2,941,761
GUIDANCE SYSTEM FOR AERIAL REFUELING
Filed Aug. 22, 1957  4 Sheets-Sheet 4

INVENTORS
ARTHUR P. NOTTHOFF, JR.
BY JAMES E. COX
John F Lawler
ATTORNEY

United States Patent Office 2,941,761
Patented June 21, 1960

2,941,761
GUIDANCE SYSTEM FOR AERIAL REFUELING

James E. Cox, Los Altos, and Arthur P. Notthoff, Jr., Menlo Park, Calif., assignors to Textron Inc., Belmont, Calif., a corporation of Rhode Island Filed Aug. 22, 1957, Ser. No. 679,706

12 Claims. (Cl. 244—135)

This invention relates to an apparatus for refueling aircraft during flight, and in particular electrical means associated with such apparatus for directing the receiver aircraft into operative contact with fuel transfer hose of the tanker aircraft.

In the aerial refueling system with which the present invention is concerned, a length of hose is trailed behind and below a tanker plane, and the pilot of a receiver aircraft, which has a forwardly extending probe nozzle, maneuvers his ship until the probe enters the transfer coupling on the end of the hose. A rearwardly flared drag device, called a drogue, is attached to this coupling to stabilize its flight and additionally serves to guide the probe nozzle into final contact with the coupling. Such a drogue is described in a co-pending application, Serial No. 636,371 of C. G. Gordon and Lysle B. Robbins entitled "Aerodynamic Drag Device" and assigned to the assignor of the instant invention. During the final stages of the receiver's approach to and ultimate engagement with drogue and coupling, skillful control of the aircraft as well as clear visibility are required. Therefore this refueling operation is extremely difficult to execute under conditions of limited or zero visibility, such as during rain or snow or at night. While systems have been proposed for electrically and reflectively illuminating the drogue to overcome this difficulty, none has proved successful.

A general object of this invention is the provision of an electrical system for continuously and automatically indicating the direction of flight of the receiver aircraft with respect to the reception coupling. Another object is the provision of an aerial refueling guidance system which enables the receiver pilot to make fueling contact with the reception coupling by instrumentation exclusively. A further object is the provision of refueling guidance means which establishes a position communication link between the hose reception coupling and the receiver aircraft without, however, introducing jamming and security problems. Another object is to provide compact lightweight, simple guidance apparatus which is safe to operate in proximity to highly combustible fuel.

These and other objects of the invention will become apparent from the following description of a preferred embodiment thereof, reference being made to the accompanying drawings in which:

Figure 4 is an elevation of the probe nozzle on the front of the receiver aircraft and showing the relative positions of the sensing coils.

Figure 5 is the transverse section taken on line 5—5 of Figure 4.

Figure 6 is a schematic diagram illustrating the physical orientation of the transmitting and sensing coils with respect to the magnetic fields created by the former.

Figure 7 is a diagram illustrating the lines of force comprising the azimuth magnetic field, and the angle which the lines of force make with the pick-up coil when the latter is on or offset from the target axis.

According to the present invention, magnetic fields are generated at the trailing end of the refueling hose, and these fields induce signal voltages in sensing coils mounted on the receiver aircraft. The fields are created by a pair of wire coils arranged with their axes in mutually perpendicular relation and connected to an alternating current generator in the tanker. These coils produce two orthogonal magnetic fields which expand and collapse sinusoidally and in phase difference. A sensing or pick-up coil mounted on the receiver aircraft intercepts the alternating fields and develops voltages which vary in amplitude and in phase depending upon the extent and sense of vertical and lateral deviation of the coil, and thus the receiver aircraft, from the line of flight of the drogue. In other words, if the receiver aircraft is not aligned with the drogue axis, the pick-up coil generates an error voltage which is proportional to the deviation. If no voltage is developed, the receiver aircraft is "on target." These error signals are amplified and detected by a circuit in the receiver aircraft and are passed to a null indicator on the pilot's instrument panel. This indicator registers the degree and direction of azimuth and elevation deviation. By maneuvering the receiver aircraft and observing the null indicator, the pilot corrects the error signals to zero for both right-left and up-down deviations, and thus he establishes an "on target" flight direction along the axis of the drogue. Another sensing coil on the receiver aircraft measures the distance or range between the drogue and the receiver aircraft. The voltage output from the range coil is a measure of the field intensity which varies with range, and is measured on an instrument calibrated to read range directly. By means of these two instruments—the alignment or null indicator and the range indicator—the pilot has complete information for correctly pointing his aircraft toward the reception coupling and ultimately directing the probe into the coupling without necessarily being able to visually observe the drogue.

Figure 1:
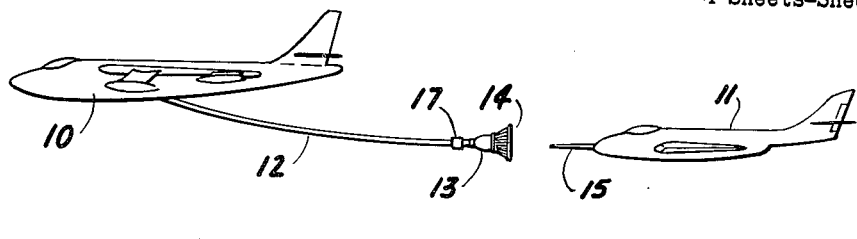
Figure 1 is schematic drawing of a receiver aircraft approaching the refueling apparatus of a tanker, and illustrating generally a refueling operation in which a magnetic system for guiding the receiver to the drogue is employed.

Referring now to the drawings, Figure 1 shows the relative positions of the tanker plane 10 and a receiver plane 11 during the aerial refueling operation. The fuel hose 12 trails below the tanker plane 10 and has a coupling 13 and a collapsible drogue 14 connected at the hose end. The probe 16 on the front of the receiver plane is adapted to pass through the drogue 14 into the coupling 13 through which fuel is pumped from the tanker to the receiver aircraft. The present invention helps the pilot to initially locate the drogue in flight and to steer his ship toward it, and comprises a magnetic guidance system which produces and transmits relative position information to the pilot by instrumentation. In particular, the magnetic guidance system functions as a directional beam along which the pilot guides the receiver aircraft. If the receiver is off this beam, the instruments indicate this condition to the pilot who corrects the flight path of the aircraft, and brings it back to the beam.

Figure 2:
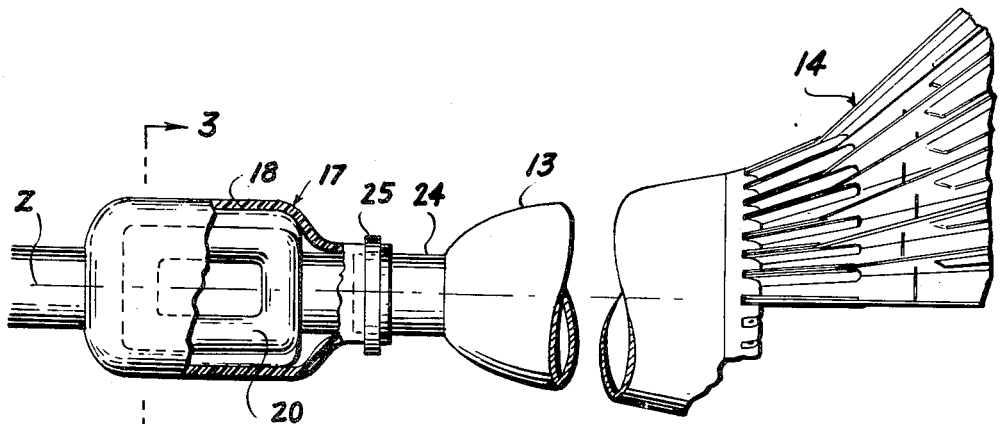
Figure 2 is an enlarged fragmentary view of the reception coupling and drogue showing the transmitting coils mounted on the hose ahead of the coupling.
Figure 3:
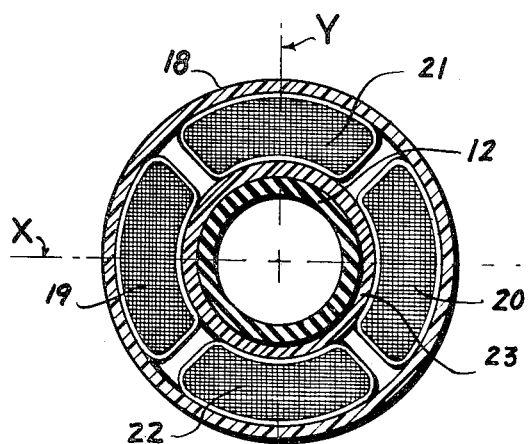
Figure 3 is an enlarged transverse section taken on line 3—3 of Figure 2.

Magnetic fields are produced by a transmitter coil assembly 17 preferably mounted on the hose 12 adjacent to the reception coupling 13. This coil assembly preferably comprises a dielectric housing 18, see Figures 2 and 3, containing a pair of azimuth coils 19 and 20, and a pair of elevation coils 21 and 22. These coils may be curved to conform to the hose periphery and are press fitted between a mounting sleeve 23 and the housing 18, and the latter may be fastened to hose adapter 24 by clamp 25 so that the transmitter coils are relatively fixed on the hose. Azimuth coils 19 and 20 are connected in series aiding relation and have a common axis X, and elevation coils 21 and 22, also connected in series aiding, have a common axis Y.

The transmitter coil assembly preferably is mounted on the hose with the coil axes X and Y perpendicular to each other and also perpendicular to the hose axis. Under operating conditions with the hose fully extended from the tanker, the axis of the hose adjacent to the coupling is substantially aligned with the axes of the drogue and coupling. Therefore the axes X and Y of the transmitter coils are perpendicular to the drogue axis, and the magnetic fields emanating from these coils have a fixed space relationship with the drogue, and more particularly with the drogue axis. In other words, the two orthogonal magnetic fields define a "magnetic beam" or reference direction which coincides with the drogue axis. The receiver aircraft is aligned with the drogue axis by the use of magnetic sensing means carried on the receiver aircraft. Normally the drogue axis is horizontal during refueling operations and the receiver aircraft flies horizontally during its approach to the coupling. However, the success of the operation is not dependent upon level flight of the drogue and receiver aircraft, although this is desirable.

It should be noted that the transmitter coils desirably should be stabilized so that the X and Y axes of the coils are horizontal and vertical, respectively, under flight operating conditions. If the hose structure is sufficiently torsionally rigid that no substantial twisting of the hose occurs, the transmitter coils can be mounted directly on the hose, as shown in the drawings. If the hose is susceptible to twisting beyond limits that can be tolerated by the system, the transmitter coil assembly should be mounted on the coupling or on the drogue, and suitable means should be employed to automatically orient the coupling or drogue in a fixed angular position about the flight path so that the transmitter coils are held in the proper angular position.

The transmitter coils are energized by a suitable power supply carried in the tanker plane and connected to the coils by transmission lines mounted on the exterior of the hose. This power supply is a two-phase generator capable of developing a high current at low voltage, and by way of example, may comprise an oscillator having a two-phase output at 10 kc. and delivering 15 amps. at 33.3 volts and 0.5 kva., which produces satisfactory results for operating ranges of 1,500 feet or more. It will be noted that power requirements of the system are conducive to safety in proximity to combustible fuel since the danger of arcing or sparking is minimized by reason of the low voltage power characteristic.

The alternating magnetic fields produced by the transmitter coils are detected by a pick-off coil 27 and by a reference or range coil 28 carried on the receiver aircraft. The pick-off coil is mounted concentrically of and rearwardly on probe 15 within a dielectric housing 27a, while the reference coil 28 preferably is mounted inside the front part of the receiver aircraft. The geometric planes of coils 27 and 28 are mutually perpendicular and the axis Y' of reference coil 28 is substantially parallel to the axis Y of elevation transmitter coils 21 and 22 when the receiver aircraft is in level flight. In other words, when the receiver aircraft is "on target" with the axis Z' of the probe aligned with the axis Z of the drogue, the plane of pick-off coil 27 is perpendicular to the drogue axis so that substantially no magnetic coupling exists between transmitter and pick-off coils, and the axes of reference coil 28 and elevation transmitter coils 21 and 22 are parallel so that a maximum magnetic coupling exists between the latter coils.

The physical relationship and the relative positions of the transmitter and receiver coils will be more readily understood by reference to Figure 6. The mutually perpendicular reference axes X, Y and Z are arranged so that the Z axis is coincident with the common axis of the drogue and coupling, the X axis is in the horizontal plane, and the Y axis extends vertically. The transmitter coils are illustrated as single coils for the sake of simplicity, and 21 designates the elevation coil which lies in the X—Z plane, while 19 indicate the azimuth coil disposed in the Y—Z plane. The plane of pick-off coil 27 on the probe nozzle of the receiver aircraft is parallel to the X—Y plane when the axis of the probe nozzle is parallel to or coincident with the axis of the drogue. Reference coil 28 lies in a horizontal or X—Z plane when the receiver aircraft is "on target." The fields generated by these coils are illustrated schematically by broken lines $L_a$ and $L_e$ representing the lines of force in the azimuth field and in the elevation field, respectively. It will be understood that the field of each coil actually surrounds the entire coil and that Figure 6 shows only that portion of the field which is directed toward the receiver aircraft.

The above described orientation of the receiver pick-off and reference coils is such that there is a maximum magnetic coupling between elevation transmitter coil 21 and reference coil 28 when the receiver aircraft is "on target" and there is substantially no magnetic coupling between the pick-off coil and the transmitter coils under these conditions. That is to say, when the longitudinal axis of the probe nozzle is aligned with the drogue axis, the voltage induced in the pick-off coil 27 by the alternating magnetic field is substantially zero and the induced voltage in the reference coil is maximum. When the probe axis is either displaced transversely of the drogue axis, or is positioned at an angle to the drogue axis, or both, a voltage proportional to the translational and angular deviation is induced in the pick-off coil. This principle of measuring or indicating such deviations is shown schematically in Figure 7 in which the curved equally spaced lines $L_a$ represent the lines of force comprising the magnetic field of the azimuth transmitter coil 19 and the arrows indicate the instantaneous direction of the field. When pick-off coil 27 is in the position indicated at (a) in Figure 7, it is in the "on target" position, and the direction of the lines of force is such that no voltage is induced in the pick-off coil by magnetic field. However, if coil 27 is laterally or angularly displaced with respect to the Z axis, a voltage is induced therein and is a measure of the deviation. For example, assume coil 27 is moved to the upper position (b) in the X—Z plane offset from the X axis, as shown. The direction of the field now is at an angle $d_1$ with the plane of the coil so that a component of the field induces a voltage therein which is proportional to sin $d_1$. Now assume coil 27 is moved to the lower position (c) on the opposite side of the X axis and also is angularly displaced as shown. The field makes an angle $d_2$ with the plane of the coil and induces in the coil a total azimuth error voltage having a phase opposite to that induced in the coil at position (b). These induced azimuth voltages in pick-off coil 27 are amplified and compared with the voltage of reference coil 28 to derive a signal voltage of variable magnitude and sense for driving an azimuth null indicator on the instrument panel of the receiver aircraft. Elevation error voltages are produced and detected by the same technique. If the pick-off coil 27 is displaced up or down from the elevation null position in the X—Y plane, a voltage is induced in the pick-off coil by the changing field of the elevation transmitter coil 21, and this induced voltage is amplified, detected and impressed on a suitable indicator to register up and down deviations of the receiver aircraft from the path of flight of the drogue.

It will be observed that it is entirely possible to achieve a null reading on the receiver indicators while the axis of the receiver probe nozzle is displaced from the magnetic beam axis, that is, from the Z axis in the drawings. Referring to Figure 7, as coil 27 at station (b) is rotated from the solid line position to that shown in broken lines, the voltage induced in the coil by the azimuth magnetic field is reduced substantially to zero, since the plane of the coil becomes parallel to the direction of the field. This means that the azimuth null indicator tells the receiver pilot that the azimuth heading of his aircraft is correct at that moment. However, as the receiver aircraft advances toward the drogue on the same course, an azimuth error signal is indicated and should be corrected so that the approach of the receiver aircraft generally follows a curved path indicated generally by the broken line P.

The reference coil, as its name implies, is designed to give a reference voltage with which the signal voltages induced in the pick-off coil are compared for ultimate resolution into signals proportional to left-right and up-down deviations. The reference coil also provides range information, that is, the distance between the receiver aircraft and the drogue, and so the reference coil is oriented for maximum magnetic coupling with the elevation transmitter coil 21. In other words, the elevation field intensity, which is proportional to range, is measured by voltage induced in coil 28, and this voltage is read directly in terms of range by a suitable indicator.

It will be understood that the accuracy of range measurement depends to some degree upon the proper relative orientation of the transmitter coils and the reference coil. If either the transmitter assembly or the reference coil rotate relative to each other, the magnetic coupling with reference coil is affected and a range error results. For this reason, among others, it is desirable that the transmitter assembly be stabilized in the horizontal and vertical planes under operating conditions.

Figure 8:
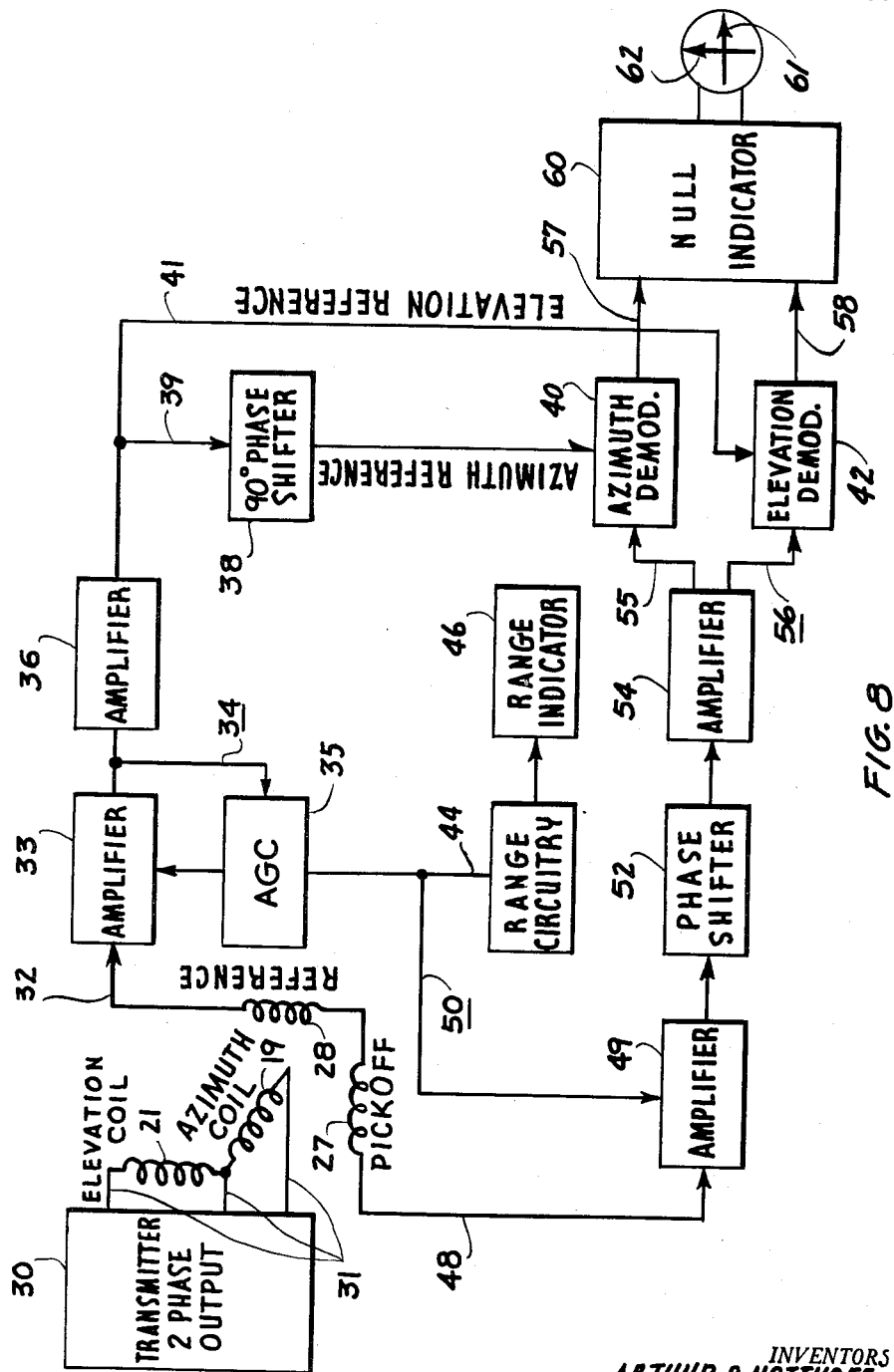
Figure 8 is a block diagram of the magnetic guidance system circuit.

The circuitry for transmitting, receiving and detecting drogue position information according to this invention is shown in Figure 8 in block diagram. The elevation coil 21 and the azimuth coil 19 are connected, as shown, to the output of a two-phase transmitter 30, and the axes of the two transmitter coils are perpendicular to each other. The two-phase output of the transmitter energizes coils 19 and 21 so that the current in one of the coils is 90 degrees out of phase with the current in the other. In other words, the two magnetic fields generated by these coils have a 90 degree electrical and space phase difference between them. The receiver circuits are responsive to voltages induced in pick-off coil 27 and in reference coil 28 and comprise novel arrangement of individual networks and components which are designed to amplify, detect and finally present drogue position information on suitable indicator instruments. Since these individual circuits are well known in the art and do not, per se, constitute a part of this invention, the general circuit arrangement is shown in Figure 8 in block diagram form.

Reference coil 28 is connected by line 32 to an A.-C. amplifier 33, the output of which is connected by line 34 to a feed back circuit 35 providing automatic gain control (AGC) for the amplifier. This AGC circuit varies the gain of amplifier 33 so that the output of the latter is substantially constant over a wide range of variation in the magnitude of the signals induced in the reference coil. The output of the AGC circuit is proportional to the signal voltage induced in the reference coil. The output of amplifier 33 is further amplified and inverted by amplifier 36 and passes through branch line 38 to a phase shift network 39 which shifts the phase of the voltage in the branch by 90 degrees and provides an azimuth reference or comparison voltage for operation of an azimuth demodulation circuit 40. Branch line 41 connects the output of amplifier 36 to a corresponding elevation demodulation circuit 42 and provides the latter with an elevation reference voltage for detection of elevation signals. The output of AGC circuit 35 is also connected by line 44 to a range detector circuit 45. Since the voltage induced in coil 28 is a measure of magnetic field intensity and since the output of the AGC circuit 35 is proportional to the magnitude of the induced voltage in coil 28, the magnitude of the voltage input to the range detector circuit 45 is a measure of the field intensity and thus the distance between the drogue and the receiver aircraft. Range circuit 45 amplifies the AGC output and drives an indicator 46 which is calibrated to read directly in units of length.

The output of the pick-off coil 27 is connected by line 48 to amplifier 49, and the output of the range AGC circuit 35 is fed by line 50 to amplifier 49 to control its gain so that the output of the latter amplifier is substantially constant in magnitude. This gain control decreases the sensitivity of the azimuth and elevation detection circuits as the range decreases because the higher level of signals induced in the pick-off coil at short ranges tends to overdrive the amplifiers and the indicator. Amplifier 49 is connected to a phase shift network 52 which corrects undesirable phase shift in the signal and provides phase calibration for the detector circuit. The phase corrected signal is amplified by amplifier 54, the output of which is divided between lines 55 and 56 connected to the azimuth and elevation demodulation circuits 40 and 42, respectively. The alternating signal voltage from pick-off coil 27 is rectified and is compared with the azimuth and elevation reference voltages by circuits 40 and 42, respectively, and the direct error signals appearing at lines 57 and 58 have a magnitude and a polarity corresponding to the extent and the sense of the translational and angular deviations of the receiver aircraft from a line to the drogue. These error signals are impressed on a suitable null indicator 60 having azimuth and indicator needles 61 and 62, respectively, for visually presenting the total position deviation.

Figure 9:
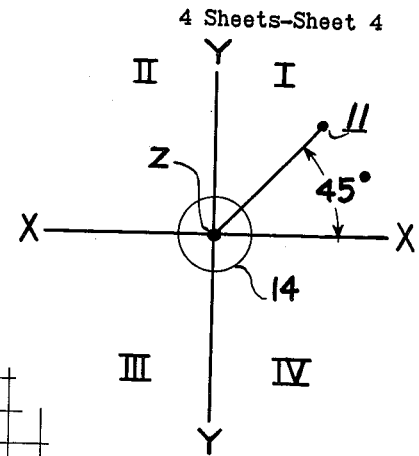
Figure 9 is a schematic diagram of the drogue as viewed from the rear and showing the position quadrants which define the characteristics of the error signals induced in the sensing coils.
Figure 10:
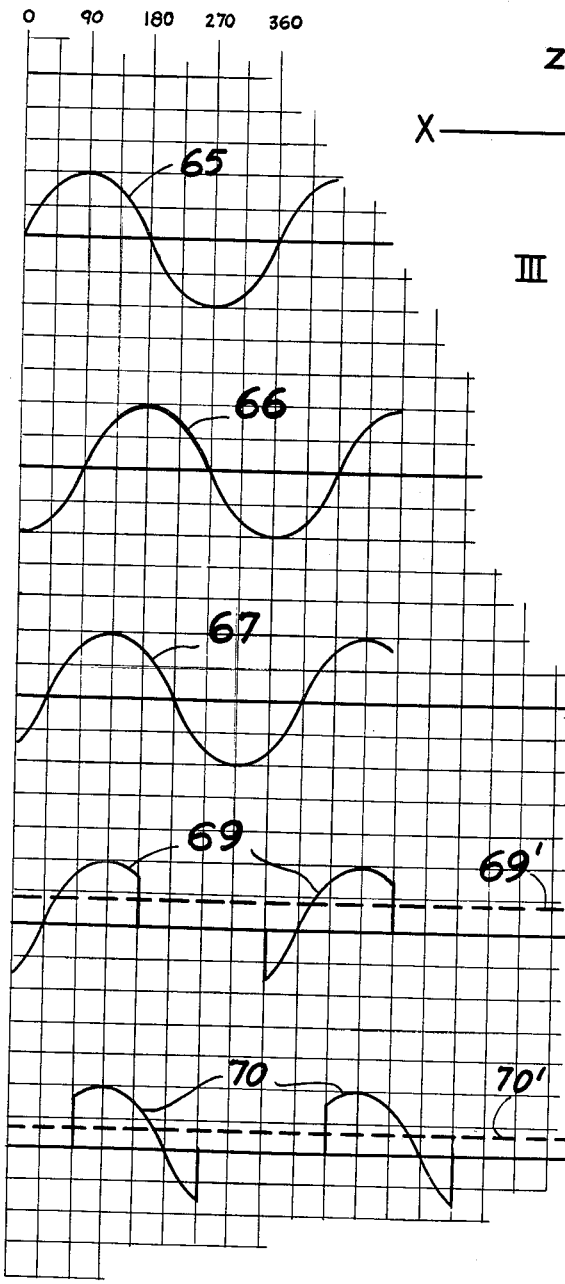
Figure 10 is a diagram showing voltage waveforms which illustrate the operation of the detector circuit.

The operation of the azimuth and elevation demodulation circuits 40 and 42, respectively, will be better understood by reference to Figures 9 and 10. A rear end view of the drogue 14 is indicated in Figure 9 by a circle having its center on the Z axis at the intersection of the X and Y axes, and the point 11 represents an assumed position of the receiver aircraft with respect to the drogue; the axis of the probe nozzle being parallel to the drogue axis in this example. The X and Y axes divide the drogue target area into quadrants I, II, III and IV. The receiver 11 is offset to the right and above the axis of the drogue in quadrant I, so that a line from the drogue to the receiver aircraft makes an angle of 45 degrees with each of the X—Z and Y—Z planes. Referring now to Figure 10, the azimuth reference voltage, which is derived from the phase shifter 38 (Figure 8), is indicated at 65 in Figure 10 (a), and the elevation reference voltage 66 in Figure 10 (b) is 90 degrees out of phase with the azimuth voltage 65. The signal developed by the pick-off coil 27 and which ultimately is impressed on demodulator circuits 40 and 4 by lines 55 and 56, respectively, is shown in Figure 10 (c) at 67. It will be noted the error signal 67 is displaced in phase by 45 degrees from the azimuth and elevation reference signals 65 and 66, and corresponds to the displacement of the receiver aircraft from the drogue axis as represented in the example of Figure 9. Of course, an error signal will also be developed in the pick-off coil when the receiver aircraft is not aimed toward the drogue, and so the receiver pilot corrects both translational and angular errors by simply maneuvering his ship until the error signal is zero.

The demodulation circuits 40 and 42 comprise conventional rectifiers which essentially are turned on and off by the alternating reference voltages 65 and 66. When the azimuth reference voltage 65 is on its positive half cycle, the azimuth rectifier conducts and the error signal that is impressed on the rectifier input during this period appears at the rectifier output. As soon as reference voltage 65 becomes negative, the azimuth rectifier ceases to conduct and its output is zero. The waveform of the rectified or demodulated azimuth error signal is indicated in Figure 10 (d) by reference character 69. The rectifier output voltage is smoothed and the resultant direct current output has a polarity corresponding to the phase of the error voltage, that is, the direct current output of the azimuth rectifier is positive when the receiver aircraft 11 is in quadrant I or IV, and is negative for quadrants II and III. The elevation demodulation circuit operates in a similar manner to produce a direct current voltage 70, see Figure 10 (e), having a magnitude and polarity corresponding to the extent and sense of deviation of the receiver aircraft from the X—Z plane. For the conditions assumed in Figure 9, the outputs of both the azimuth and elevation demodulators are positive as indicated by the average direct current levels at 69′ and 70′ above the zero reference line. These voltages are impressed across null indicator 60 so that needles 61 and 62 register the amount and direction of deviation of the receiver aircraft from the axis of the drogue.

The magnetic guidance system described above is useful in other types of aerial refueling techniques to assist in bringing the receiver aircraft and the refueling apparatus on the tanker into operative engagement. For example, another technique involves the use of a boom type apparatus which extends down from the tanker and whose movements are regulated by the boom operator inside the tanker. The receiver aircraft pilot maneuvers his ship within the range movement of the boom and thereafter flies a steady course, maintaining a fixed distance between his ship and the tanker. The boom operator then adjusts the position of the boom until the coupling on the end of the boom engages the probe nozzle on the receiver aircraft. The present invention is readily adaptable for use with this apparatus by mounting the transmitter assembly on the receiver aircraft and the sensing coils on the boom. The range and deflection indicators adjacent the boom operator in the tanker aircraft would then provide the operator with the necessary position information to enable him readily to engage the boom on the probe nozzle.

While we have shown and described indicators as the means for presenting the position information to a pilot to enable him to correct the flight path of his aircraft, it is possible to automatically control the movements of the receiver aircraft by feeding the error signal to an automatic pilot mechanism. Such mechanisms are well known in the art and could be readily adapted to operate in response to the magnetic system described above. An automatic pilot system has the advantage of instantaneous response to the error signals and elimination of the human element in the guidance of the receiver aircraft to the drogue.

Changes in and modifications to the above described preferred embodiment of our invention may occur to those skilled in the art without departing from the precepts of our invention. For example, devices or mechanisms other than coils might be used for transmitting and sensing the magnetic fields without however departing from the principle underlying our invention. Thus, a pair of rotatable permanent magnets may be adapted to function as a transmitter, and certain compounds, such as indium antimonide, which are responsive to magnetic fields, could be used as a magnetic sensing means to produce a signal. Therefore we do not wish our patent to be limited in any way inconsistent with the advance our invention has made in the art.

Having described our invention, what is claimed is:

1. In a system for refueling a receiver aircraft from a tanker aircraft, a fuel hose trailing from the tanker aircraft and having a reception coupling and drogue at its free end, the drogue and coupling having a common substantially horizontal longitudinal axis, the improvement of magnetic guidance means for directing the receiver aircraft toward the drogue and coupling comprising at least two electric coils having mutually perpendicular axes and being mounted on said hose adjacent the coupling with each coil axis perpendicular to said coupling axis, a source of alternating current connected to said coils for generating mutually perpendicular alternating magnetic fields, a pick-off coil mounted on said receiver aircraft with the axis of the coil coincident with the longitudinal axis of said receiver aircraft, detector circuit means connected to said pick-off coil for detecting voltages induced in said pick-off coil by said magnetic fields, and indicator means connected to said circuit means for measuring said detected voltages.

2. A magnetic guidance system according to claim 1 in which said detector circuit means includes a reference coil having its axis perpendicular to the axis of said pick-off coil, said reference coil being responsive to at least one of said fields for developing a voltage proportional to range.

3. A magnetic guidance system according to claim 2 in which said detector circuit means also includes means for comparing the pick-off coil voltage with said reference coil voltage and deriving an error signal proportional to deviation of said receiver aircraft from a flight path toward said drogue.

4. A guidance system for aerial refueling comprising, in combination, a fuel transfer hose, a reception coupling having an axis and mounted on the end of said hose, drag means on said coupling for holding the coupling axis horizontally, a pair of coils mounted adjacent said coupling with the axis of each coil perpendicular to the other and to the coupling axis, means to supply said coils with alternating current for generating orthogonally related alternating magnetic fields, a receiver aircraft spaced from said coupling and having an elongated forwardly extending probe nozzle with an axis, a pick-off coil mounted concentrically of said nozzle, said pick-off coil being responsive to said magnetic fields for producing output signals indicative of relative positions of said receiver aircraft and said coupling, and circuit means for detecting and measuring said signals.

5. In a system for refueling a receiver aircraft from a tanker aircraft, a fuel hose trailing from the tanker and having a reception coupling and a drogue at its end, the longitudinal axes of said drogue and said coupling being aligned, said receiver aircraft having a forwardly extending probe nozzle adapted to operatively engage said reception coupling, the improvement of a guidance system for directing said receiver aircraft toward said drogue and coupling, comprising at least two electric transmitter coils supported adjacent to said coupling, a source of two-phase alternating current connected to said coils whereby said coils generate two alternating magnetic fields, respectively, said receiver aircraft having magnetic sensing means responsive to said magnetic fields for generating signals indicative of the physical position of the receiver aircraft with respect to the reception coupling, and detector and indicator means in said receiver aircraft connected to said sensing means for measuring said signals.

6. In a system for refueling a receiver aircraft from a tanker aircraft via two mating coupling elements connected to the receiver aircraft and the tanker aircraft, respectively, position detecting and indicating apparatus comprising an electric transmitter coil located adjacent to one of said coupling elements, alternating current supply means connected to said coil and creating an alternating magnetic field around said coil, a sensing coil located adjacent to the other of said coupling elements and within said magnetic field, said coil being responsive to said field for generating a signal voltage, and detector circuit means electrically connected to said sensing coil and responsive to phase and magnitude of said signal voltage.

7. In a system for refueling a receiver aircraft from a tanker aircraft via two mating coupling elements connected to the receiver aircraft and the tanker aircraft, respectively, position detecting and indicating apparatus comprising an electric transmitter coil having an axis and located adjacent to one of said coupling elements, alternating current supply means connected to said coil and creating an alternating magnetic field around said coil, a sensing coil located adjacent to the other of said coupling elements and within said magnetic field, said sensing coil being oriented with its axis perpendicular to the transmitter coil axis, circuit means electrically connected to said sensing coil and comprising a source of reference voltage, a comparison circuit, said sensing coil and said reference voltage source being connected to and compared by said comparison circuit, the output of said comparison circuit being a direct current having a polarity and magnitude proportional to the phase and magnitude of the voltage induced in said sensing coil by said field, and an indicator connected to and responsive to the output of said comparison circuit.

8. In a system for refueling a receiver aircraft from a tanker aircraft via two mating coupling elements connected to the receiver aircraft and the tanker aircraft, respectively, apparatus for transmitting, detecting and indicating the relative positional information of the two coupling elements, comprising an electric transmitter coil having an axis and located adjacent to one of said coupling elements, alternating current supply means connected to said coil and creating an alternating magnetic field around said coil, a pick-off coil and reference coil located adjacent to the other of said coupling elements and within said magnetic field, said pick-off coil being oriented with its axis perpendicular to the axis of said transmitter coil, said reference coil being oriented with its axis parallel to the axis of said transmitter coil, and detector circuit means comprising a comparison circuit having an input connected to said pick-off and reference coils, and an indicator connected to the output of said comparison circuit.

9. In a system for refueling a receiver aircraft from a tanker aircraft via two mating coupling elements connected to the receiver aircraft and the tanker aircraft, respectively, position detecting and indicating apparatus comprising an azimuth transmitter coil and an elevation transmitter coil located adjacent to one of said coupling elements, two-phase alternating current supply means connected to said coils and creating two orthogonal alternating magnetic fields around said coils, a pick-off coil and a reference coil, each located adjacent to the other of said coupling elements and spaced from said first coupling elements within said magnetic fields, circuit means electrically connected to said pick-off and reference coils comprising an amplifier connected to said reference coil, a feedback circuit connected between the output and the input of said amplifier and providing automatic gain control for said amplifier, range indicating means connected to said feedback circuit, demodulator circuit means connected to the output of said amplifier and to the output of said pick-off coil, and indicator means responsive to the output of said demodulator circuit means for indicating translational and angular deviations of said pick-off coil relative to said transmitter coils.

10. Apparatus for refueling a receiver aircraft from a tanker aircraft, comprising, a hose adapted to be trailed from the tanker aircraft, a reception coupling on the free end of said hose, a magnetic field transmitter supported near the end of the hose, magnetic field sensing means located on said receiver aircraft in the transmitted fields and developing signals which vary with relative changes of position of said receiver aircraft and said reception coupling, and circuit means connected to said sensing means for detecting said signals.

11. In an aerial refueling system, a tanker aircraft, a receiver aircraft, a hose adapted to be extended from said tanker aircraft for transferring fuel to said receiver aircraft, the improvement of a magnetic guidance system for guiding said receiver aircraft into operative refueling engagement with said hose, said system comprising a magnetic field transmitter on the end of said hose, a magnetic field sensing device on said receiver aircraft, circuit means to measure the output of said sensing device, and indicating means connected to said circuit means.

12. An aerial refueling system comprising a tanker aircraft, a hose extending from said tanker aircraft, a coupling on the end of said hose, a receiver aircraft having a probe adapted to be inserted into said coupling while both aircraft are in flight, a magnetic field transmitter supported by said hose, and magnetic field sensing and detecting means on said receiver aircraft for guiding the latter toward said coupling.

References Cited in the file of this patent

UNITED STATES PATENTS

| | | |
|---|---|---|
| 2,379,417 | Conrad | July 3, 1945 |
| 2,634,926 | Worlidge | Apr. 14, 1953 |
| 2,731,624 | Krucoff | Jan. 17, 1956 |
| 2,767,943 | Janney et al. | Oct. 23, 1956 |